United States Patent
Ogata et al.

(10) Patent No.: US 10,008,706 B2
(45) Date of Patent: Jun. 26, 2018

(54) LAMINATED SEPARATOR FOR NONAQUEOUS ELECTROLYTE SECONDARY BATTERY, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days. days.

(21) Appl. No.: 15/336,301

(22) Filed: Oct. 27, 2016

(65) Prior Publication Data

US 2017/0125768 A1    May 4, 2017

(30) Foreign Application Priority Data

Oct. 29, 2015  (JP) ................................ 2015-213355
Jan. 13, 2016  (JP) ................................ 2016-004391
Feb. 10, 2016  (JP) ................................ 2016-024165

(51) Int. Cl.
  *H01M 2/16* (2006.01)
  *H01M 2/14* (2006.01)
  *H01M 10/052* (2010.01)

(52) U.S. Cl.
  CPC ......... *H01M 2/1686* (2013.01); *H01M 2/145* (2013.01); *H01M 2/1653* (2013.01); *H01M 10/052* (2013.01)

(58) Field of Classification Search
  CPC ............................ H01M 2/1686; H01M 2/145
  See application file for complete search history.

(56) References Cited

U.S. PATENT DOCUMENTS

| | | |
|---|---|---|
| 2011/0212362 A1 | 9/2011 | Miyamori et al. |
| 2015/0236323 A1 | 8/2015 | Honda et al. |
| 2015/0255768 A1 | 9/2015 | Konishi et al. |

FOREIGN PATENT DOCUMENTS

| | | |
|---|---|---|
| JP | 2005294216 A | 10/2005 |
| JP | 2014011042 A | 1/2014 |
| JP | 2014017264 A | 1/2014 |
| KR | 1020110098669 A | 9/2011 |
| KR | 1020140081807 A | 7/2014 |
| KR | 1020140114428 A | 9/2014 |

OTHER PUBLICATIONS

Arora et al, "Battery Separators," Chem. Rev., vol. 104, pp. 4419-4462 (2004).
Office Action dated Mar. 3, 2017 in KR Application No. 10-2016-0076987.
Office Action dated Nov. 11, 2016 in KR Application No. 10-2016-0076987.
Office Action dated Aug. 16, 2016 in JP Application No. 2016024165.
Office Action dated Jul. 28, 2016 in KR Application No. 10-2016-0076987.

*Primary Examiner* — Olatunji Godo
(74) *Attorney, Agent, or Firm* — Panitch Schwarze Belisario & Nadel LLP

(57) ABSTRACT

The present invention provides a laminated separator, for a nonaqueous electrolyte secondary battery, suppressing a deterioration in cycle characteristic. The laminated separator includes: a porous film containing a polyolefin-based resin; and a porous layer, a surface of the porous layer having a 60-degree specular gloss of 3% to 26%, a volume per unit area of the porous layer being 0.1 $cm^3/m^2$ to 2.5 $cm^3/m^2$.

5 Claims, No Drawings

LAMINATED SEPARATOR FOR NONAQUEOUS ELECTROLYTE SECONDARY BATTERY, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. § 119 on Patent Application No. 2015-213355 filed in Japan on Oct. 29, 2015, Patent Application No. 2016-004391 filed in Japan on Jan. 13, 2016, and Patent Application No. 2016-024165 filed in Japan on Feb. 10, 2016, the entire contents of which are hereby incorporated by reference.

TECHNICAL FIELD

The present invention relates to a laminated separator for a nonaqueous electrolyte secondary battery, a nonaqueous electrolyte secondary battery member, and the nonaqueous electrolyte secondary battery.

BACKGROUND ART

Nonaqueous electrolyte secondary batteries such as a lithium secondary battery are currently in wide use as batteries for devices such as a personal computer, a mobile telephone, and a portable information terminal.

A nonaqueous electrolyte secondary battery, typified by a lithium secondary battery, has a high energy density and may thus let a large current flow and generate heat in a case where a breakage in the battery or in the device using the battery has caused an internal or external short circuit. This risk has created a demand that a nonaqueous electrolyte secondary battery should prevent more than a certain level of heat generation to ensure a high level of safety.

Safety of a nonaqueous electrolyte secondary battery is typically ensured by imparting to the nonaqueous electrolyte secondary battery a shutdown function, that is, a function of, in a case where there has been abnormal heat generation, preventing passage of ions between the cathode and the anode with use of a separator to prevent further heat generation. More specifically, a nonaqueous electrolyte secondary battery typically includes, between the cathode and the anode, a separator that has a function of, in a case where, for example, an internal short circuit between the cathode and the anode has caused an abnormal current to flow through the battery, preventing that current and preventing (shutting down) the flow of an excessively large current for prevention of further heat generation. The separator is typically made of a filmy porous film whose main component is, for example, a polyolefin-based resin which melts at approximately 80° C. to 180° C. when abnormal heat generation occurs.

There has been known a technique of laminating a porous layer on at least one surface of a porous film in order to improve a function of a separator made of the porous film. For example, Patent Literature 1 discloses that, in order to prevent an internal short circuit of a battery, a porous film containing an inorganic filler and a film binding agent is laminated on a separator which is a microporous sheet made of a polyolefin-based resin. A porous film which is thin, uniform, and excellent in flexibility is realized by defining an 85-degree specular gloss of the porous film.

Patent Literature 2 discloses a technique in which a 60-degree specular gloss is defined with respect to a separator which is obtained by applying, to a polyethylene microporous film, a composition containing insulating fine particles and an organic binder, in order to prevent a short circuit and improve reliability.

CITATION LIST

Patent Literatures

Patent Literature 1
Japanese Patent Application Publication, Tokukai, No. 2005-294216 (Publication Date: Oct. 20, 2005)
Patent Literature 2
Japanese Patent Application Publication, Tokukai, No. 2014-17264 (Publication Date: Jan. 30, 2014)

SUMMARY OF INVENTION

Technical Problem

However, Patent Literatures 1 and 2 each have objects of improving flexibility, preventing a short circuit, and improving reliability, and do not take cycle characteristic into consideration.

The present invention has been accomplished in view of the problem, and an object of the present invention is to provide a laminated separator for a nonaqueous electrolyte secondary battery which laminated separator suppresses a deterioration in cycle characteristic.

Solution to Problem

The inventors of the present invention have focused for the first time on a fact that (i) a 60-degree specular gloss of a surface of a porous layer and (ii) a volume per unit area of the porous layer of a laminated separator for a nonaqueous electrolyte secondary battery which laminated separator includes a porous film and a porous layer relates to a cycle characteristic of a nonaqueous electrolyte secondary battery including the laminated separator. The inventors of the present invention have completed the present invention by finding that it is possible to suppress a deterioration in cycle characteristic of the nonaqueous electrolyte secondary battery by adjusting the 60-degree specular gloss and the volume per unit area of the porous layer to fall within a predetermined range.

In order to attain the object, a laminated separator, in accordance with an embodiment of the present invention, for a nonaqueous electrolyte secondary battery is a laminated separator for a nonaqueous electrolyte secondary battery, including: a porous film containing a polyolefin-based resin; and a porous layer, a surface of the porous layer having a 60-degree specular gloss of 3% to 26%, a volume per unit area of the porous layer being 0.1 $cm^3/m^2$ to 2.5 $cm^3/m^2$.

The laminated separator in accordance with an embodiment of the present invention is preferably configured such that the porous layer contains a filler.

The laminated separator in accordance with an embodiment of the present invention is preferably configured such that the porous layer contains a filler and a resin, a proportion of the filler being 5% by mass to 99% by mass with respect to a total amount of the filler and the resin.

The laminated separator in accordance with an embodiment of the present invention is preferably configured such that the porous film has piercing strength of not less than 2 N.

The laminated separator in accordance with an embodiment of the present invention is preferably configured such that the porous film has an average pore diameter of not more than 0.14 μm.

A nonaqueous electrolyte secondary battery member in accordance with an embodiment of the present invention includes: a cathode; the laminated separator; and an anode, the cathode, the laminated separator, and the anode being disposed in this order.

A nonaqueous electrolyte secondary battery in accordance with an embodiment of the present invention includes the laminated separator.

Advantageous Effects of Invention

The present invention brings about an effect of suppressing a deterioration in cycle characteristic of a nonaqueous electrolyte secondary battery.

DESCRIPTION OF EMBODIMENTS

The description below deals with an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the Description, any numerical range expressed as "A to B" means not less than A and not greater than B" unless otherwise stated.

[1. Laminated Separator for Nonaqueous Electrolyte Secondary Battery]

A laminated separator, in accordance with an embodiment of the present invention, for a nonaqueous electrolyte secondary battery is provided between a cathode and an anode in the nonaqueous electrolyte secondary battery and includes (i) a filmy porous film containing a polyolefin-based resin as a main component and (ii) a porous layer which is laminated on at least one surface of the porous film.

[1-1. Porous Film]

The porous film only needs to be a porous and filmy base material (i.e., a polyolefin-based porous base material) containing a polyolefin-based resin as a main component. That is, the porous film is a film that (i) has therein pores connected to one another and (ii) allows gas or a liquid to pass therethrough from one surface to the other surface. In other words, the porous film in accordance with an embodiment of the present invention is a film having pores and differs from a nonwoven fabric in which fibers are piled up on one another.

The porous film can be arranged such that in a case where the nonaqueous electrolyte secondary battery generates heat, the porous film is melted so as to render a nonaqueous electrolyte secondary battery separator non-porous. Thus, the porous film can provide a shutdown function to the nonaqueous electrolyte secondary battery separator. The porous film can be made of a single layer or a plurality of layers.

The porous film has a volume-based porosity of preferably 0.2 to 0.8 (20% by volume to 80% by volume), and more preferably 0.3 to 0.75 (30% by volume to 75% by volume), in order to allow the separator to (i) retain a larger amount of electrolyte solution and (ii) achieve a function of reliably preventing (shutting down) the flow of an excessively large current at a lower temperature. The porous film has pores each having an average diameter (an average pore diameter) of preferably not more than 0.14 μm, more preferably not more than 0.1 μm, and preferably not less than 0.01 μm, in order to, in a case where the porous film is used as a separator, achieve sufficient ion permeability and prevent particles from entering the cathode and/or the anode.

The average pore diameter of the porous film is controlled through, for example, a method of, in a case of reducing the pore diameter, (i) uniformizing the dispersion state of a pore forming agent such as an inorganic filler or of a phase separating agent during production of the porous film, (ii) using, as a pore forming agent, an inorganic filler having smaller particle sizes, (iii) drawing the porous film in a state where the porous film contains a phase separating agent, or (iv) drawing the porous film at a low extension magnification. The porosity of the porous film is controlled through, for example, a method of, in a case of producing a porous film having a high porosity, (i) increasing the amount of a pore forming agent such as an inorganic filler or of a phase separating agent relative to the polyolefin-based resin, (ii) drawing the porous film after the phase separating agent has been removed, or (iii) drawing the porous film at a high extension magnification.

A decrease in the average pore diameter of the porous film should increase a capillary force, which is presumed to serve as a driving force for introducing the electrolyte solution into pores inside the polyolefin base material. Furthermore, a smaller average pore diameter can subdue generation of dendrites of lithium metal.

Further, an increase in the porosity of the porous film should decrease the volume of a portion of the polyolefin base material which portion contains a polyolefin that cannot be permeated by the electrolyte solution.

The porous film has a piercing strength of preferably not less than 2N, and more preferably not less than 3N. The porous film having excessively small piercing strength may allow cathode active material particles and anode active material particles to pierce the separator so that a short circuit occurs between the cathode and the anode, for example, in a case where (i) an operation of stacking the cathode, the anode, and the separator and then rolling up the stack thus obtained is carried out in a battery assembly process, (ii) an operation of pressing the stack thus rolled up is carried out in the battery assembly process, or (iii) an external pressure is applied to the battery. The porous film has piercing strength of preferably not more than 10N, and more preferably not more than 8N.

It is essential that the porous film contains a polyolefin-based resin component at a proportion of not less than 50% by volume with respect to whole components contained in the porous film. Such a proportion of the polyolefin-based resin component is preferably not less than 90% by volume, and more preferably not less than 95% by volume. The porous film preferably contains, as the polyolefin-based resin component, a high molecular weight component having a weight-average molecular weight of $5 \times 10^5$ to $15 \times 10^6$. The porous film particularly preferably contains, as the polyolefin-based resin component, a polyolefin-based resin component having a weight-average molecular weight of 1,000,000 or more. This is because that a whole of the porous film (i.e., the nonaqueous electrolyte secondary battery separator) achieves higher strength.

Examples of the polyolefin-based resin include high molecular weight homopolymers or copolymers produced through polymerization of ethylene, propylene, 1-butene, 4-methyl-1-pentene, 1-hexene, and/or the like. The porous film can be a layer containing only one of these polyolefins and/or a layer containing two or more of these polyolefins. Among these, a high molecular weight polyethylene containing ethylene as a main component is particularly preferable. Note that the porous film can contain another component which is not a polyolefin, as long as the another component does not impair the function of the layer.

The porous film has an air permeability normally in a range of 30 sec/100 cc to 500 sec/100 cc, and preferably in a range of 50 sec/100 cc to 300 sec/100 cc, in terms of Gurley values. A porous film having an air permeability within such a range achieves sufficient ion permeability in a case where the porous film is used in the separator.

A thickness of the porous film is determined as appropriate in view of the number of layers in the laminated separator. Particularly, since the porous layer is formed on one surface (or both surfaces) of the porous film, the porous film has a thickness of preferably 4 µm to 40 µm, and more preferably a thickness of 7 µm to 30 µm. The porous film has a weight per unit area of normally 4 g/m$^2$ to 20 g/m$^2$, and preferably 5 g/m$^2$ to 12 g/m$^2$. This is because that a porous film having such a weight per unit area enables to provide suitable strength, thickness, handling easiness, and weight and is also possible to enhance a weight energy density and/or a volume energy density of the nonaqueous electrolyte secondary battery in a case where the porous film is used in the separator of the nonaqueous electrolyte secondary battery.

The porous film may be produced through any publicly-known technique, and is not particularly limited to any specific method. For example, as disclosed in Japanese Patent Application Publication, Tokukaihei, No. 7-29563 A (1995), the porous film may be produced through a method of (i) adding a pore forming agent to a thermoplastic resin to shape the thermoplastic resin into a film and then (ii) removing the pore forming agent with use of an appropriate solvent.

Specifically, in a case of, for example, producing a porous film with use of a polyolefin resin containing (i) an ultra high molecular weight polyethylene and (ii) a low molecular weight polyolefin having a weight-average molecular weight of 10,000 or less, such a porous film is, in terms of production cost, preferably produced through the method including the steps of:

(1) kneading (i) 100 parts by weight of the ultra high molecular weight polyethylene, (ii) 5 parts by weight to 200 parts by weight of the low molecular weight polyolefin having a weight-average molecular weight of 10,000 or less, and (iii) 100 parts by weight to 400 parts by weight of an inorganic filler such as calcium carbonate to produce a polyolefin resin composition;

(2) shaping the polyolefin resin composition into a sheet;

(3) Removing the Inorganic Filler from the Sheet Produced in the Step (2); and (4) drawing the sheet produced in the step (3) so as to obtain a porous film.

[1-2. Porous Layer]

The porous layer in accordance with an embodiment of the present invention can be a layer that (i) has therein many pores connected to one another and (ii) allows gas or a liquid to pass therethrough from one surface to the other surface. According to the present embodiment, the porous layer may be a layer which (i) is provided on one surface or both surfaces of the porous film as an outermost layer of the separator and (ii) can be adhered to an electrode.

The inventors of the present invention have diligently studied and found that in a case where a 60-degree specular gloss of a surface of the porous layer is 3% to 26%, it is possible to suppress a deterioration in cycle characteristic of the nonaqueous electrolyte secondary battery including the laminated separator including the porous layer. Note that the 60-degree specular gloss of the porous layer indicates a gloss which is obtained in a case where an incident angle and a light-receiving angle of the porous layer are each 60° and the 60-degree specular gloss is measured by a method defined in JIS Z8741. A specular gloss of the porous layer is a parameter related to denseness, uniformity, and the like of the porous layer.

The specular gloss is based on an amount of reflected light. The porous layer has openings on a surface thereof. Accordingly, incident light for measuring the specular gloss of the porous layer enters an inside of the porous layer.

The light which has entered the inside of the porous layer is reflected (mirror-reflected or diffuse-reflected) or scattered on surfaces of the resin which surfaces constitute inner walls of holes inside the porous layer. The light thus reflected or scattered is partially emitted, as internally reflected light, from the surface of the porous layer to outside.

It has been known that an amount of light reflected inside a porous body is influenced by a size and shape of a void in the porous body (see Takehiro YAMADA, "Study for Characteristic of Microcellular Plastic", Saitama Industrial Technology Center Research Report, Vol. 4 (2006); and National Institute of Information and Communications Technology, "Research and development of new reflective plate for cost reduction of liquid crystal display device", Research and development result report for FY 2006 (April 2007)).

Accordingly, a person skilled in the art will be able to sufficiently understand, based on the Description, that the specular gloss reflects a state of an entire inside of the separator.

In a case where the porous layer has a 60-degree specular gloss of less than 3%, the porous layer has low uniformity, and thus has non-uniform ion permeability. As a result, deterioration of the porous layer caused by repeated charge and discharge of the nonaqueous electrolyte secondary battery progresses faster, which leads to a deterioration in cycle characteristic. Accordingly, in a case where the porous layer has a 60-degree specular gloss of not less than 3%, it is possible to suppress a deterioration in cycle characteristic caused by non-uniformity of the porous layer.

Meanwhile, in a case where the porous layer has a 60-degree specular gloss of more than 26%, the porous layer has an excessively high denseness, and thus the pores are blocked by an insoluble byproduct and/or air bubbles caused by charge and discharge. This leads to an increase in battery internal resistance. Further, there is less space for an electrolyte solution to be retained at an interface between the porous layer and the electrode, so that the electrolyte solution is more likely to be partially dried up due to repeated charge and discharge. This causes a decrease in ion permeability, which leads to a deterioration in cycle characteristic. Accordingly, the porous layer having a 60-degree specular gloss specular gloss of not more than 26% can prevent the cycle characteristic from deteriorating due to (i) the blockage of the pores by the insoluble byproduct and/or (ii) the drying up of the electrolyte solution at the interface between the porous layer and the electrode.

A lower limit of the 60-degree specular gloss of the surface of the porous layer is preferably not less than 4%, and more preferably not less than 5%. That is, the porous layer has a 60-degree specular gloss of preferably not less than 4% and not more than 26%, and more preferably not less than 5% and not more than 26%. Further, an upper limit of the 60-degree specular gloss of the surface of the porous layer is preferably not more than 22%, and more preferably not more than 18%.

A volume per unit area of the porous layer is 0.1 cm$^3$/m$^2$ to 2.5 cm$^3$/m$^2$. In a case where the porous layer has (i) a volume per unit area which falls under the above range and (ii) a 60-degree specular gloss of 3% to 26%, it is possible to achieve an effect of suppressing a deterioration in cycle characteristic. In a case where the volume per unit area of the porous layer is less than 0.1 cm$^3$/m$^2$, a cycle characteristic is deteriorated due to (i) blockage of pores with an insoluble byproduct and/or (ii) an insufficient function of retaining the electrolyte solution at the interface between the porous layer and the electrode. In a case where the volume per unit area of the porous layer exceeds 2.5 cm$^3$/m$^2$, ion permeability of the porous layer decreases, which leads to a low battery characteristic from the beginning.

Specific examples of the resin contained in the porous layer include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as vinylidene fluoride-hexafluoropropylene copolymer, tetrafluoroethylene-hexafluoropropylene copolymer, tetrafluoroethylene-perfluoroalkyl vinyl ether copolymer, vinylidene fluoride-tetrafluoroethylene copolymer, vinylidene fluoride-trifluoroethylene copolymer, vinylidene fluoride-trichloroethylene copolymer, vinylidene fluoride-vinyl fluoride copolymer, vinylidene fluoride-hexafluoropropylene-tetrafluoroethylene copolymer, and ethylene-tetrafluoroethylene copolymer; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of 180° C. or higher such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

Among the above resins, fluorine-containing resins and aromatic polyamides are preferable. Among the fluorine-containing resins, a polyvinylidene fluoride-based resin is more preferable such as polyvinylidene fluoride (PVDF) and a copolymer of vinylidene fluoride (VDF) and hexafluoropropylene (HFP). Of the two, PVDF is more preferable.

The porous layer may contain a filler. The porous layer may contain a filler made of organic matter or a filler made of inorganic matter. Specific examples of the filler made of organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl methacrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; and polyacrylic acid and polymethacrylic acid. Specific examples of the filler made of inorganic matter include fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, a filler made of inorganic matter (typically called "filling material") is suitable. A filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. While alumina has many crystal forms such as α-alumina, β-alumina, γ-alumina, and θ-alumina, any of the crystal forms can be used suitably. Among the above crystal forms, α-alumina is the most preferable because it is particularly high in thermal stability and chemical stability.

An embodiment of the present invention may use (i) only a single filler or (ii) two or more of fillers in combination.

The filler has a volume average particle size of preferably 0.01 μm to 10 μm, in order to ensure (i) fine adhesion and fine slidability and (ii) shaping easiness of the separator. A lower limit of the volume average particle size is more preferably not less than 0.1 μm, whereas an upper limit of the volume average particle size is more preferably not more than 5 μm.

The filler is constituted by particles of any shape, which may be a sphere, an ellipse, a plate-shape, a bar-shape, or an irregular shape. In order to prevent a short circuit in the battery, the particles are preferably (i) plate-shaped particles or (ii) primary particles which are not aggregated.

The filler forms fine bumps on a surface of the porous layer, thereby improving the slidability. A filler constituted by (i) plate-shaped particles or (ii) primary particles which are not aggregated forms finer bumps on the surface of the porous layer, so that the porous layer is adhered to the electrode more favorably.

The porous layer contains the filler at a proportion of 5% by mass to 99% by mass, more preferably 10% by mass to 99% by mass, still more preferably 25% by mass to 99% by mass, and particularly preferably 50% by mass to 99% by mass with respect to a total amount of the resin and the filler. In a case where the porous layer contains the filler at a proportion of less than 5% by mass, the low proportion of the filler in the porous layer may cause the filler to be unevenly distributed in the porous layer when, for example, the filler is applied to the porous film so that the porous layer is formed. This may lead to a deterioration in uniformity of the porous layer. Further, the low proportion of the filler in the porous layer also makes it difficult to exhibit a function (e.g., heat resistance) which is imparted to the porous layer by the filler. Meanwhile, in a case where the porous layer contains the filler at a proportion of more than 99% by mass, the decreased proportion of the resin in the porous layer reduces a binding property of particles of the filler, which leads to a problem such as a loss of the filler during handling of the separator.

In order to ensure adhesion to the electrode and a high energy density, the porous layer has, on one surface of the porous film, an average thickness of preferably 0.5 μm to 10 μm, and more preferably 1 μm to 5 μm.

The porous layer is preferably made porous sufficiently, in terms of ion permeability. Specifically, the porous layer has a porosity of preferably 30% to 60%. The porous layer has an average pore size of preferably 20 nm to 100 nm.

The porous layer has a coefficient of kinetic friction of preferably 0.1 to 0.6, more preferably 0.1 to 0.4, and further preferably 0.1 to 0.3. The coefficient of kinetic friction is a value measured by a method according to JIS K7125. Specifically, a coefficient of kinetic friction in an embodiment of the present invention is a value measured by Surface Property Tester (available from Heidon).

[2. Method for Producing Laminated Separator for Nonaqueous Electrolyte Secondary Battery]

A method for producing a laminated separator, in accordance with an embodiment of the present invention, for a nonaqueous electrolyte secondary battery is not limited to any particular one, but can be selected from various methods, provided that the above-described laminated separator for a nonaqueous electrolyte secondary battery can be obtained. The laminated separator in accordance with an embodiment of the present invention is produced by forming a porous layer containing a resin through, for example, any one of methods (1) to (3) below.

(1) Method of (i) applying to a surface of the porous film a coating solution in which a resin for forming a porous layer is dissolved and then (ii) immersing the resulting film into a deposition solvent as a poor solvent for the resin to deposit a porous layer containing the resin;

(2) Method of (i) applying to a surface of the porous film a coating solution in which a resin for forming a porous layer is dissolved and then (ii) making the coating solution acidic with use of low-boiling proton acid to deposit a porous layer containing the resin; and (3) Method of (i) applying to a surface of the porous film a coating solution in which a resin for forming a porous layer is dissolved and then (ii) evaporating the solvent in the coating solution to deposit a porous layer containing the resin.

The methods (1) and (2) may each further involve a step of, after a porous layer has been deposited, drying the laminated body produced.

The solvent (disperse medium) in which the resin is dissolved may be any solvent that does not adversely influence the porous film, that allows the resin to be dissolved uniformly and stably, and that allows the filler to be dispersed uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide. The present embodiment may use only one kind of solvent (disperse medium) or two or more kinds of solvents in combination. In a case where in any of the above methods, the resin for forming a porous layer is, for example, a polyvinylidene fluoride (PVDF)-based resin, the solvent in which the PVDF-based resin is dissolved is preferably an amide-based solvent such as N-methylpyrrolidone, more preferably N-methylpyrrolidone.

The deposition solvent is, for example, a solvent (hereinafter referred to as "solvent X") other than the solvent (disperse medium) in the coating solution which solvent X is dissolvable in the solvent (disperse medium) in the coating solution and which solvent X does not dissolve the resin in the coating solution. The solvent (disperse medium) may be efficiently removed from the coating solution by (i) immersing into the solvent X a porous film to which the coating solution has been applied to form a coating film, (ii) substituting the solvent X for the solvent (disperse medium) in the coating film on the porous film or a support, and then (iii) evaporating the solvent X. Specific examples of the deposition solvent include water; lower alcohols such as methyl alcohol, ethyl alcohol, n-propyl alcohol, isopropyl alcohol, and t-butyl alcohol; and acetone. The present embodiment may use only one kind of deposition solvent or two or more kinds of deposition solvents in combination. In a case where in the method (1), the resin for forming a porous layer is, for example, a PVDF-based resin, the solvent for depositing a porous layer is preferably isopropyl alcohol or t-butyl alcohol.

In the method (2), the low-boiling proton acid is, for example, hydrochloric acid or acetic acid.

In the method (3), the solvent is evaporated through a conventionally publicly known drying method. Particularly, far infrared heating and freeze drying are advantageous over other drying methods (such as air drying) in that the respective shapes of holes in the porous layer are not easily changeable during the deposition.

The laminated separator in accordance with an embodiment of the present invention may alternatively be produced by forming, on a surface of a porous film as a base material, a porous layer containing a resin through the method (4) below.

(4) Method of (i) applying to a base material a coating solution containing a disperse medium such as water and fine particles of the resin for forming a porous layer which fine particles are dispersed in the disperse medium and (ii) drying the disperse medium for removal to form a porous layer.

In the method (4), the disperse medium is preferably water. Further, a laminated film before the drying may be immersed in a lower alcohol to dilute or substitute the disperse medium such as water with the lower alcohol. In this case, the lower alcohol is preferably isopropyl alcohol or t-butyl alcohol.

To form a porous layer containing a filler, the filler may be dispersed in the coating solution in which the resin for forming a porous layer is dissolved.

There is no particular limit to how the coating solution is applied to the porous film, that is, how a porous layer is formed on a surface of a porous film that has been subjected to a hydrophilization treatment as necessary. In a case where a porous layer is deposited on each of both surfaces of the porous film, (i) a sequential deposition method may be used, which forms a porous layer on one surface of the porous film and then forms another porous layer on the other surface, or (ii) a simultaneous deposition method may be used, which forms two porous layers simultaneously on respective surfaces of the porous film.

The thickness of the porous layer may be controlled by adjusting, for example, (i) the thickness of a coating layer in a wet state after the coating, (ii) the weight ratio of the resin and the filler, and/or (iii) the solid content concentration of the coating solution (that is, the sum of the resin concentration and the filler concentration).

The coating solution is applied to the porous film through any method that allows the coating solution to be applied in a necessary weight per unit area with a necessary coating area. The coating solution may be applied through a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The above drying may be performed with use of a normal drying device. The drying is performed at a drying temperature that does not decrease the air permeability of the porous film, specifically 10° C. to 120° C., preferably 20° C. to 80° C., to prevent pores in the porous film from contracting to decrease the air permeability of the porous film.

The 60-degree specular gloss of the surface of the porous layer can be adjusted by carrying out, with respect to the surface of the porous layer, a publicly known treatment such as a surface treatment by use of sandpaper or the like, an acid treatment, an alkali treatment, a chemical treatment involving an organic solvent or the like, a corona treatment, or a plasma treatment. By employing the above treatments as appropriate, it is possible to produce a porous layer having a 60-degree specular gloss of 3% to 26%. Among the above treatments, the chemical treatment involving an organic solvent or the like is preferable. Examples of the organic solvent include ketone such as acetone; amide such as N-methyl-2-pyrrolidone (NMP), dimethylacetamide, and dimethylformamide; cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. Among the above organic solvents, it is preferable to carry out the treatment by using diethyl carbonate. In a case where the chemical treatment involving an organic solvent such as diethyl carbonate is carried out with respect to the surface of the porous layer, the 60-degree specular gloss of the surface of the porous layer tends to be increased.

[2. Nonaqueous Electrolyte Secondary Battery]

A nonaqueous electrolyte secondary battery in accordance with an embodiment of the present invention achieves an electromotive force through doping and dedoping with lithium. The nonaqueous electrolyte secondary battery in accordance with an embodiment of the present invention only needs to include a laminated body (nonaqueous electrolyte secondary battery member) in which a cathode sheet, the above-described laminated separator, and an anode sheet are laminated, and is not particularly limited in other arrangements. The nonaqueous electrolyte secondary battery includes (i) a battery element made of a structure (a) including the anode sheet and the cathode sheet facing each other via the above-described laminated separator and (b) containing the electrolyte solution and (ii) an exterior member including the battery element. The nonaqueous electrolyte secondary battery is particularly applicable to a lithium ion secondary battery. Note that the doping means storage, support, absorption, or insertion, and means a phenomenon in which lithium ions enter an active material of the electrode (e.g., the cathode).

The cathode sheet may be achieved as an active material layer which (i) is formed on a current collector and (ii) includes a cathode active material and a binder resin. The active material layer may further include a conductive auxiliary agent.

Examples of the cathode active material include a lithium-containing transition metal oxide, specific examples of which include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include a polyvinylidene fluoride-based resin.

Examples of the conductive auxiliary agent include carbon materials such as acetylene black, Ketjenblack, and graphite powder.

Examples of the current collector include aluminum foil, titanium foil, and stainless steel foil each having a thickness of 5 μm to 20 μm.

The anode sheet may be achieved as an active material layer which (i) is formed on a current collector and (ii) includes an anode active material and a binder resin. The active material layer may further include a conductive auxiliary agent. Examples of the anode active material include a material capable of electrochemical storage of lithium. Specific examples of such a material include a carbon material; and an alloy of (i) lithium and (ii) silicon, tin, aluminum, or the like.

Examples of the binder resin include a polyvinylidene fluoride-based resin and styrene-butadiene rubber. The separator of an embodiment of the present invention is able to ensure sufficient adhesion to the anode even if the anode includes styrene-butadiene rubber as the anode binder.

Examples of the conductive auxiliary agent include carbon materials such as acetylene black, Ketjenblack, and graphite powder.

Examples of the current collector include copper foil, nickel foil, and stainless steel foil each having a thickness of 5 μm to 20 μm. Instead of the anode described above, metallic lithium foil may be employed as the anode.

The electrolyte solution is a solution made of a nonaqueous solvent in which a lithium salt is dissolved. Examples of the lithium salt include $LiPF_6$, $LiBF_4$, and $LiClO_4$.

Examples of the nonaqueous solvent include all solvents normally used in a nonaqueous electrolyte secondary battery. Examples of the nonaqueous solvent include cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. An embodiment of the present invention may use only (i) one kind of solvent or (ii) two or more kinds of solvents in combination selected from the above.

The electrolyte solution is preferably the one obtained by (i) preparing a solvent through mixing of cyclic carbonate and chain carbonate at a mass ratio (cyclic carbonate/chain carbonate) of 20/80 to 40/60 (more preferably, 30/70) and (ii) dissolving in the solvent a lithium salt at a concentration of 0.5M to 1.5M.

Examples of the exterior member include a metal can and a pack which is made of an aluminum-laminated film. Examples of the shape of the battery include a polygon, a cylinder, and a coin shape.

It is possible to produce the nonaqueous electrolyte secondary battery by, for example, (i) causing the electrolyte solution to permeate the laminated body including the cathode sheet, the anode sheet, and the above-described laminated separator which is disposed between the cathode sheet and the anode sheet, (ii) causing the laminated body to be accommodated in the exterior member (e.g., the pack made of the aluminum-laminated layer film), and (iii) pressing the laminated body via the exterior member. It is preferable to perform the pressing while the laminated separator and the electrode are heated (hot pressing) in order to further enhance adhesion between the electrode and the separator.

A manner how the separator is disposed between the cathode sheet and the anode sheet may be (i) a manner (so-called stack system) in which at least one cathode sheet, at least one separator, and at least one anode sheet are stacked in this order or (ii) a manner in which a cathode sheet, a separator, an anode sheet, and a separator are stacked in this order and the stack thus obtained is rolled up in a direction along a length of the stack.

EXAMPLES

The following description will discuss the present invention with reference to Examples, but the present invention is not limited to this.

<Measurement of Specular Gloss>

A specular gloss of a laminated separator for a nonaqueous electrolyte secondary battery was measured by use of a gloss meter (manufactured by NIPPON DENSHOKU INDUSTRIES Co., LTD.; PG-IIM type) in such a manner that (i) five sheets of KB paper (manufactured by KOKUYO Co., Ltd.; product No. KB-39N) were stacked on one another, (ii) the laminated separator whose specular gloss was to be measured was placed on top of the five sheets of KB paper, and (iii) the measurement was carried out with an incident angle and a light-receiving angle of the laminated separator each set to 60°.

Note that, if necessary, for example, in a case where a matter such as resin powder and an inorganic matter is adhered to a surface of the laminated separator, it is possible to carry out, before the measurement of the specular gloss, a pretreatment of the laminated separator, for example, by (i) immersing the laminated separator in an organic solvent such as diethyl carbonate (DEC) and/or water and washing off the matter thus adhered and then (ii) drying off the organic solvent and/or water.

<Measurement of Piercing Strength>

A porous film was fixed with a washer of 12 mmΦ by use of a handy-type compression tester (KATO TECH CO., LTD.; model No. KES-G5). Piercing strength of the porous film was defined as a maximum stress (N) obtained by piercing the porous film with a pin at 200 mm/min. The pin used in the measurement had a pin diameter of 1 mmΦ and a tip radius of 0.5 R.

<Measurement of Volume Per Unit Area of Porous Layer>

A weight per unit area (weight per 1 square meter) of the porous layer in a dried state was measured and the weight per unit area was divided by specific gravity of the porous layer at 25° C., so that a volume per unit area (volume per 1 square meter) of the porous layer in a dried state was measured.

<Production of Separator>

Laminated separators, in accordance with Examples 1 through 4 and Comparative Examples 1 through 4, for a nonaqueous electrolyte secondary battery were produced as below.

Example 1

Sodium carboxymethylcellulose (CMC) (manufactured by Daicel Corporation; CMC1110) was used as a binder resin. Fluoroapatite (manufactured by Wako Pure Chemical Industries, Ltd.; apatite FAP, hexagonal crystal) was used as a filler. Fluoroapatite, CMC, and a solvent (a mixed solvent of water and isopropyl alcohol) were mixed together in the ratio below. That is, 3 parts by weight of the CMC was mixed with 100 parts by weight of the fluoroapatite, and a resultant mixture was mixed with the solvent so that (i) a mixed solution obtained had a solid content (fluoroapatite+CMC) concentration of 27.7% by weight and (ii) the solvent had a composition of 95% by weight of water and 5% by weight of isopropyl alcohol. Thus obtained was a dispersion liquid. Then, the dispersion liquid thus obtained was high-pressure dispersed (under a condition of 100 MPa×3 passes) by use of a high-pressure dispersing device (manufactured by Sugino Machine Limited; Star Burst), so that a coating solution was obtained. The coating solution thus obtained was applied to a polyethylene porous film (thickness 16.5 μm, porosity 51%, average pore diameter 0.096 μm) by a gravure method, and then was dried so that a laminated porous film (1-i) was obtained. The laminated porous film (1-i) thus obtained was immersed in diethyl carbonate, and then was allowed to stand at 70° C. for 5 minutes. The laminated porous film (1-i) was taken out from diethyl carbonate and then was dried at room temperature, so that a laminated separator in accordance with Example 1 for a nonaqueous electrolyte secondary battery was obtained. Table 1 shows a battery characteristic maintaining ratio after 100 cycles of the laminated separator in accordance with Example 1.

Example 2

A laminated separator in accordance with Example 2 for a nonaqueous electrolyte secondary battery was obtained by a method similar to that of Example 1, except that fluorine-containing mica (manufactured by Wako Pure Chemical Industries, Ltd.; synthetic mica; non-swelling) was used as a filler. Table 1 shows a battery characteristic maintaining ratio after 100 cycles of the laminated separator in accordance with Example 2.

Example 3

A PVDF-based resin (manufactured by Arkema Inc.; product name "KYNAR2801") was stirred and dissolved in N-methyl-2-pyrrolidone at 65° C. for 30 minutes so that a solid content was 10% by mass. A resultant solution was used as a binder solution. Alumina fine particles (manufactured by Sumitomo Chemical Co., Ltd.; product name "AKP3000") were used as a filler. The alumina fine particles, the binder solution, and a solvent (N-methyl-2-pyrrolidone) were mixed together in the ratio below. That is, the binder solution was mixed with the alumina fine particles so that a mixture containing 90 parts by weight of the PVDF-based resin with respect to 10 parts by weight of the alumina fine particles was obtained, and the solvent was mixed with the mixture so that a mixed solution obtained had a solid content (alumina fine particles+PVDF-based resin) concentration of 7% by weight. Thus obtained was a dispersion liquid. The dispersion liquid thus obtained was stirred and mixed twice at 2000 rpm for 30 seconds at room temperature with use of a planetary centrifugal mixer (manufactured by Thinky Corporation; product name "AWATORI RENTARO"). A resultant mixed solution was applied as a coating solution to a polyethylene porous film (thickness 12 μm, porosity 44%, average pore diameter 0.035 μm) through a doctor blade method. A laminated body (2-i), which was a material thus obtained by applying the coating solution to the polyethylene porous film, was immersed in 2-propanol while a coating layer remained wet with NMP, and then was allowed to stand at 25° C. for 5 minutes, so that a laminated porous film (2-ii) was obtained. While the laminated porous film (2-ii) thus obtained was in an immersion solvent wet state, the laminated porous film (2-ii) was further immersed in another 2-propanol, and then was allowed to stand at 25° C. for 5 minutes, so that a laminated porous film (2-iii) was obtained. The laminated porous film (2-iii) thus obtained was dried at 65° C. for 5 minutes, so that a laminated porous film (2-iv) was obtained. The laminated porous film (2-iv) thus obtained was immersed in diethyl carbonate, and then was allowed to stand at 70° C. for 1 minute. The laminated porous film (2-iv) was taken out from diethyl carbonate and then was dried at room temperature, so that a laminated separator in accordance with Example 3 for a nonaqueous electrolyte secondary battery was obtained. Table 1 shows a battery characteristic maintaining ratio after 100 cycles of the laminated separator in accordance with Example 3.

Example 4

A laminated separator in accordance with Example 4 for a nonaqueous electrolyte secondary battery was obtained by a method similar to that of Example 3, except that the laminated porous film (2-iv) was immersed in diethyl carbonate, and then was allowed to stand at 70° C. for 15 minute. Table 1 shows a battery characteristic maintaining ratio after 100 cycles of the laminated separator in accordance with Example 4.

Comparative Example 1

A PVDF-based resin (manufactured by Arkema Inc.; product name "KYNAR2801") was stirred and dissolved in N-methyl-2-pyrrolidone at 65° C. for 30 minutes so that a solid content was 7% by mass. A resultant solution was applied as a coating solution to a polyethylene porous film (thickness μm, porosity 44%, average pore diameter 0.035 μm) through a doctor blade method. A laminated body (3-i), which was a material thus obtained by applying the coating solution to the polyethylene porous film, was immersed in 2-propanol while a coating layer remained wet with NMP, and then was allowed to stand at 25° C. for 5 minutes, so that a laminated porous film (3-ii) was obtained. While the laminated porous film (3-ii) thus obtained was in an immersion solvent wet state, the laminated porous film (3-ii) was further immersed in another 2-propanol, and then was allowed to stand at 25° C. for 5 minutes, so that a laminated porous film (3-iii) was obtained. The laminated porous film (3-iii) thus obtained was dried at 65° C. for 5 minutes, so that a laminated porous film (3-iv) was obtained. Folds were formed in the laminated porous film (3-iv) thus obtained, so that a laminated separator in accordance with Comparative Example 1 for a nonaqueous electrolyte secondary battery was obtained. Table 1 shows a battery characteristic maintaining ratio after 100 cycles of the laminated separator in accordance with Comparative Example 1.

Comparative Example 2

A PVDF-based resin (manufactured by Arkema Inc.; product name "KYNAR2801") was stirred and dissolved in N-methyl-2-pyrrolidone at 65° C. for 30 minutes so that a solid content was 7% by mass. A resultant solution was applied as a coating solution to a polyethylene porous film (thickness 12 μm, porosity 44%, average pore diameter 0.035 μm) through a doctor blade method. A laminated body (4-i), which was a material thus obtained by applying the coating solution to the polyethylene porous film, was dried at 85° C. for 5 minutes, so that a laminated separator in accordance with Comparative Example 2 for a nonaqueous electrolyte secondary battery was obtained. Table 1 shows a battery characteristic maintaining ratio after 100 cycles of the laminated separator in accordance with Comparative Example 2.

Comparative Example 3

A PVDF-based resin (manufactured by Arkema Inc.; product name "KYNAR2801") was stirred and dissolved in N-methyl-2-pyrrolidone at 65° C. for 30 minutes so that a solid content was 0.3% by mass. A resultant solution was applied as a coating solution to a polyethylene porous film (thickness 12 μm, porosity 44%, average pore diameter 0.035 μm) through a doctor blade method. A laminated body (5-i), which was a material thus obtained by applying the coating solution to the polyethylene porous film, was immersed in 2-propanol while a coating layer remained wet with NMP, and then was allowed to stand at 25° C. for 5 minutes, so that a laminated porous film (5-ii) was obtained. While the laminated porous film (5-ii) thus obtained was in an immersion solvent wet state, the laminated porous film (5-ii) was further immersed in another 2-propanol, and then was allowed to stand at 25° C. for 5 minutes, so that a laminated porous film (5-iii) was obtained. The laminated porous film (5-iii) thus obtained was dried at 65° C. for 5 minutes, so that a laminated separator in accordance with Comparative Example 3 for a nonaqueous electrolyte secondary battery was obtained. Table 1 shows a battery characteristic maintaining ratio after 100 cycles of the laminated separator in accordance with Comparative Example 3.

Comparative Example 4

Sodium carboxymethylcellulose (CMC) (manufactured by Daicel Corporation; CMC1110) was used as a binder resin. Hydroxyapatite (manufactured by Wako Pure Chemical Industries, Ltd.; apatite HAP, monoclinic crystal) was used as a filler. Hydroxyapatite, CMC, and a solvent (a mixed solvent of water and isopropyl alcohol) were mixed together in the ratio below. That is, 3 parts by weight of the CMC was mixed with 100 parts by weight of the hydroxyapatite, and a resultant mixture was mixed with the solvent so that (i) a mixed solution obtained had a solid content (hydroxyapatite+CMC) concentration of 27.7% by weight and (ii) the solvent had a composition of 95% by weight of water and 5% by weight of isopropyl alcohol. Thus obtained was a dispersion liquid. Then, the dispersion liquid thus obtained was high-pressure dispersed (under a condition of 100 MPa×3 passes) by use of the high-pressure dispersing device (manufactured by Sugino Machine Limited; Star Burst), so that a coating solution was obtained. The coating solution thus obtained was applied to a polyethylene porous film (thickness 16.5 μm, porosity 51%, average pore diameter 0.096 μm) by the gravure method so that a porous layer obtained had a volume per unit area of 7.52 cm$^3$/m$^2$, and then was dried, so that a laminated separator in accordance with Comparative Example 4 for a nonaqueous electrolyte secondary battery was obtained. Table 1 shows a battery characteristic maintaining ratio after 100 cycles of the laminated separator in accordance with Comparative Example 4.

<Production of Nonaqueous Electrolyte Secondary Battery>

Next, using the laminated separators in accordance with Examples 1 through 4 and Comparative Examples 1 through 4 which were produced as above, nonaqueous electrolyte secondary batteries were produced as follows.

(Cathode)

A commercially available cathode which was produced by applying $LiNi_{0.5}Mn_{0.3}Co_{0.2}O_2$/conductive material/PVDF (weight ratio 92/5/3) to an aluminum foil was used. The aluminum foil of the cathode was cut so that a portion of the cathode where a cathode active material layer was formed had a size of 40 mm×35 mm and a portion where the cathode active material layer was not formed, with a width of 13 mm, remained around that portion. The cathode active material layer had a thickness of 58 μm and density of 2.50 g/cm$^3$.

(Anode)

A commercially available anode produced by applying graphite/styrene-1,3-butadiene copolymer/carboxymethyl cellulose sodium (weight ratio 98/1/1) to a copper foil was used. The copper foil of the anode was cut so that a portion of the anode where an anode active material layer was formed had a size of 50 mm×40 mm, and a portion where the anode active material layer was not formed, with a width of 13 mm, remained around that portion. The anode active material layer had a thickness of 49 μm and density of 1.40 g/cm$^3$.

(Assembly)

In a laminate pouch, the cathode, the laminated separator, and the anode were laminated (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by laminating an aluminum layer and a heat seal layer, and 0.25 mL of a nonaqueous electrolyte solution was poured into the bag. The nonaqueous electrolyte solution was an electrolyte solution at 25° C. obtained by dissolving $LiPF_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous electrolyte secondary battery was produced.

<Cycle Test>

New nonaqueous electrolyte secondary batteries which had not been subjected to any cycle of charge and discharge were subjected to 4 cycles of initial charge and discharge. Each cycle of the initial charge and discharge was performed under conditions that the temperature was 25° C., the voltage range was 4.1 V to 2.7 V, and the current value was 0.2 C (1 C is defined as a value of a current at which a rated capacity based on a discharge capacity at 1 hour rate is discharged for 1 hour. The same is applied hereinafter).

Subsequently, the nonaqueous electrolyte secondary batteries, which had been subjected to the initial charge and discharge, were each subjected to three cycles of charge and discharge at 55° C. The three cycles of the charge and discharge were carried out with respect to a first battery at a constant charge electric current value of 1 C and a constant discharge electric current value of 0.2 C, and the three cycles of the charge and discharge were carried out with respect to a second battery, which is different from the first battery but identical in structure to the first battery, at a constant charge electric current value of 1 C and a constant discharge electric current value of 20 C. Then, an initial battery characteristic maintaining ratio was calculated in accordance with a formula below.

Initial battery characteristic maintaining ratio (%)= (discharge capacity at 20 C/discharge capacity at 0.2 C)×100

Subsequently, the nonaqueous electrolyte secondary batteries were each subjected to 100 cycles of charge and discharge. Each cycle of the charge and discharge was performed under conditions that the temperature was 55° C., charge/discharge, constant currents were a charge current value of 1 C and a discharge current value of 1 C. Then, a battery characteristic maintaining ratio after 100 cycles was calculated in accordance with a formula below.

Battery characteristic maintaining ratio (%)=(discharge capacity at 20 C at 100th cycle/discharge capacity at 0.2 C at 100th cycle)×100

The result is shown in Table 1.

TABLE 1

| | Gloss [%] | Volume per unit area [cm$^3$/m$^2$] | Piercing strength [N] | Initial battery characteristic maintaining ratio | Battery characteristic maintaining ratio after 100 cycles |
|---|---|---|---|---|---|
| Example 1 | 6.0 | 1.39 | 3.8 | 70% | 52% |
| Example 2 | 6.0 | 2.24 | 3.8 | 76% | 39% |
| Example 3 | 3.0 | 0.71 | 5.5 | 73% | 60% |
| Example 4 | 20.0 | 0.87 | 5.2 | 76% | 57% |
| Comparative Example 1 | 2.2 | 0.56 | 6.0 | 65% | 32% |
| Comparative Example 2 | 30.4 | 0.56 | 6.5 | 43% | 27% |
| Comparative Example 3 | 20.9 | 0.01 | 5.9 | 80% | 35% |
| Comparative Example 4 | 2.6 | 7.52 | 3.8 | 63% | 15% |

As shown in Table 1, it was confirmed that, in the nonaqueous electrolyte secondary battery including the laminated separator in accordance with Comparative Example 2, which laminated separator had a 60-degree specular gloss of more than 26%, the initial battery characteristic maintaining ratio was 43% and the battery characteristic maintaining ratio after 100 cycles was 27%, which were remarkably low. This is because the porous layer having the 60-degree specular gloss of more than 26% had an excessively high denseness, and ion permeability was accordingly decreased due to (i) blockage of pores with an insoluble byproduct and/or air bubbles caused by charge and discharge and/or (ii) a deterioration in function of retaining an electrolyte solution at an interface between the separator and an electrode.

It was confirmed that, in the nonaqueous electrolyte secondary battery including the laminated separator in accordance with Comparative Example 1, which laminated separator had a 60-degree specular gloss of less than 3%, the initial battery characteristic maintaining ratio was 65% and the battery characteristic maintaining ratio after 100 cycles was 32%, which were low. This is because the porous layer having the 60-degree specular gloss of less than 3% had low uniformity, and thus had non-uniform ion permeability.

It was confirmed that, in the nonaqueous electrolyte secondary battery including the laminated separator in accordance with Comparative Example 3, in which laminated separator the porous layer had a volume per unit area of less than 0.1 cm$^3$/m$^2$, the initial battery characteristic maintaining ratio was 80%, which was high, but the battery characteristic maintaining ratio after 100 cycles was 35%, which was low. This is because the excessively small volume of the porous layer reduced an effect of suppressing a deterioration in cycle characteristic of the porous layer.

It was confirmed that, in the nonaqueous electrolyte secondary battery including the laminated separator in accordance with Comparative Example 4, in which laminated separator the porous layer had a volume per unit area of more than 2.5 cm$^3$/m$^2$, the initial battery characteristic maintaining ratio was 63%, which was low, and the battery characteristic maintaining ratio after 100 cycles was 15%, which was remarkably low. This is because the excessively large volume of the porous layer caused a deterioration in ion permeability of the porous layer.

Meanwhile, it was confirmed that, in the nonaqueous electrolyte secondary battery including the laminated separator in accordance with each of Examples 1 through 4, in which laminated separator (i) the surface of the porous layer had a 60-degree specular gloss of 3% to 26% and (ii) the volume per unit area of the porous layer was 0.1 cm$^3$/m$^2$ to 2.5 cm$^3$/m$^2$, the initial battery characteristic maintaining ratio was not less than 70% and the battery characteristic maintaining ratio after 100 cycles was not less than 39%, and thus it was possible to suppress a deterioration in cycle characteristic.

The invention claimed is:

1. A laminated separator for a nonaqueous electrolyte secondary battery, comprising:
   a porous film containing a polyolefin-based resin; and
   a porous layer containing a filler and a resin, a proportion of the filler being 5% by mass to 99% by mass with respect to a total amount of the filler and the resin,
   a surface of the porous layer having a 60-degree specular gloss of 3% to 26%,
   a volume per unit area of the porous layer being 0.1 cm$^3$/m$^2$ to 2.5 cm$^3$/m$^2$.

2. The laminated separator as set forth in claim 1, wherein the porous film has piercing strength of not less than 2 N.

3. The laminated separator as set forth in claim 1, wherein the porous film has an average pore diameter of not more than 0.14 μm.

4. A nonaqueous electrolyte secondary battery member comprising:
   a cathode;
   a laminated separator recited in claim 1; and
   an anode,
   the cathode, the laminated separator, and the anode being disposed in this order.

5. A nonaqueous electrolyte secondary battery comprising a laminated separator recited in claim 1.

* * * * *